United States Patent [19]

Lund et al.

[11] Patent Number: 4,816,175

[45] Date of Patent: Mar. 28, 1989

[54] AZEOTROPE-LIKE COMPOSITIONS OF DICHLOROTRIFLUOROETHANE, METHANOL, CYCLOPENTANE AND NITROMETHANE

[75] Inventors: Earl A. E. Lund, West Seneca; Rajat S. Basu; David P. Wilson, Both of Williamsville, all of N.Y.

[73] Assignee: Allied-Signal Inc., Morris Township, Morris County, N.J.

[21] Appl. No.: 185,716

[22] Filed: Apr. 25, 1988

[51] Int. Cl.$^4$ .......................... C09D 9/00; C11D 7/50; C11D 7/52; C23G 5/00

[52] U.S. Cl. ..................................... 252/171; 252/172; 252/153; 252/162; 134/12; 134/38; 134/39; 134/40

[58] Field of Search ............... 252/171, 172, 153, 162; 134/12, 38, 39, 40

[56] References Cited

U.S. PATENT DOCUMENTS

| | | | |
|---|---|---|---|
| 3,940,342 | 2/1976 | Hutchinson | 252/171 |
| 3,960,746 | 6/1976 | Gorski | 252/171 |
| 4,002,573 | 1/1977 | Hutchinson | 252/171 |
| 4,062,795 | 12/1977 | Hutchinson | 252/171 |
| 4,715,900 | 12/1987 | Connon et al. | 134/40 |

Primary Examiner—Paul Lieberman
Assistant Examiner—Ronald A. Krasnow
Attorney, Agent, or Firm—Jay P. Friedenson

[57] ABSTRACT

Azeotrope-like compositions comprising dichlorotrifluoroethane, methanol, cyclopentane and nitromethane are stable and have utility as degreasing agents and as solvents in a variety of industrial cleaning applications including cold cleaning and defluxing of printed circuit boards.

13 Claims, No Drawings

AZEOTROPE-LIKE COMPOSITIONS OF DICHLOROTRIFLUOROETHANE, METHANOL, CYCLOPENTANE AND NITROMETHANE

DESCRIPTION

1. Field of the Invention

This invention relates to azeotrope-like mixtures of dichlorotrifluoroethane, methanol, cyclopentane and nitromethane. These mixtures are useful in a variety of vapor degreasing, cold cleaning and solvent cleaning applications including defluxing.

2. BACKGROUND OF THE INVENTION

Vapor degreasing and solvent cleaning with fluorocarbon based solvents have found widespread use in industry for the degreasing and otherwise cleaning of solid surfaces, especially intricate parts and difficult to remove soils.

In its simplest form, vapor degreasing or solvent cleaning consists of exposing a room-temperature object to be cleaned to the vapors of a boiling solvent. Vapors condensing on the object provide clean distilled solvent to wash away grease or other contamination. Final evaporation of solvent from the object leaves behind no residue as would be the case where the object is simply washed in liquid solvent.

For difficult to remove soils where elevated temperature is necessary to improve the cleaning action of the solvent, or for large volume assembly line operations where the cleaning of metal parts and assemblies must be done efficiently and quickly, the conventional operation of a vapor degreaser consists of immersing the part to be cleaned in a sump of boiling solvent which removes the bulk of the soil, thereafter immersing the part in a sump containing freshly distilled solvent near room temperature, and finally exposing the part to solvent vapors over the boiling sump which condense on the cleaned part. In addition, the part can also be sprayed with distilled solvent before final rinsing.

Vapor degreasers suitable in the above-described operations are well known in the art. For example, Sherliker et al. in U.S. Pat. No. 3,085,918 disclose such suitable vapor degreasers comprising a boiling sump, a clean sump, a water separator, and other ancillary equipment.

Cold cleaning is another application where a number of solvents are used. In most cold cleaning applications the soiled part is either immersed in the fluid or wiped with rags or similar objects soaked in solvents.

Fluorocarbon solvents, such as trichlorotrifluoroethane, have attained widespread use in recent years as effective, nontoxic, and nonflammable agents useful in degreasing applications and other solvent cleaning applications. Trichlorotrifluoroethane has been found to have satisfactory solvent power for greases, oils, waxes and the like. It has therefore found widespread use for cleaning electric motors, compressors, heavy metal parts, delicate precision metal parts, printed circuit boards, gyroscopes, guidance systems, aerospace and missile hardware, aluminum parts and the like.

The art has looked towards azeotropic compositions including the desired fluorocarbon components such as trichlorotrifluoroethane which include components which contribute additionally desired characteristics, such as polar functionality, increased solvency power, and stabilizers. Azeotropic compositions are desired because they exhibit a minimum boiling point and do not fractionate upon boiling. This is desirable because in the previously described vapor degreasing equipment with which these solvents are employed, redistilled material is generated for final rinse-cleaning. Thus, the vapor degreasing system acts as a still. Unless the solvent composition exhibits a constant boiling point, i.e., is an azeotrope or is azeotrope-like, fractionation will occur and undesirable solvent distribution may act to upset the cleaning and safety of processing. Preferential evaporation of the more volatile components of the solvent mixtures, which would be the case if they were not azeotrope or azeotrope-like, would result in mixtures with changed compositions which may have less desirable properties, such as lower solvency towards soils, less inertness towards metal, plastic or elastomer components, and increased flammability and toxicity.

The art is continually seeking new fluorocarbon based azeotropic mixtures or azeotrope-like mixtures which offer alternatives for new and special applications for vapor degreasing and other cleaning applications. Currently, of particular interest, are such azeotrope-like mixtures which are based on fluorocarbons which are considered to be stratospherically safe substitutes for presently used fluorocarbons which are suspected of causing environmental problems in connection with the ozone layer. Dichlorotrichloroethane is considered to be such a stratospherically safe substitute. Dichlorotrichloroethane exists as two isomers viz. 2,2-dichloro-1,1,1-trichloroethane (FC-123) and 1,2-dichloro-1,1,2-trifluoroethane (FC-123a).

U.S. Pat. Nos. 3,940,342 and 4,002,573 disclose binary constant boiling compositions of 1,2-dichloro-1,1,2-trifluoroethane with trichlorofluoromethane, with diethyl ether and with dichloromethane and also ternary constant boiling compositions comprising 1,2-dichloro-1,1,2-trifluoroethane, diethyl ether and 1,2-dibromo-1,1,2,2-tetrafluoroethane.

It is accordingly an object of this invention to provide novel azeotrope-like compositions based on dichlorotrifluoroethane which have good solvency power and other desirable properties for vapor degreasing and other solvent cleaning applications.

Another object of the invention is to provide novel constant boiling or essentially constant boiling solvents which are liquid at room temperature, will not fractionate under conditions of use and also have the foregoing advantages.

A further object is to provide azeotrope-like compositions which are nonflammable both in the liquid phase and the vapor phase. These and other objects and features of the invention will become more evident from the description which follows.

DESCRIPTION OF THE INVENTION

In accordance with the invention, novel azeotrope-like compositions have been discovered comprising dichlorotrifluoroethane, methanol, cyclopentane and nitromethane. Such azeotrope-like compositions are formed when either isomer of dichlorotrifluoroethane is employed.

In a preferred embodiment of the invention, the azeotrope-like compositions comprise from about 92.8 to about 98.1 weight percent dichlorotrifluoroethane, from about 1.2 to about 2.8 weight percent methanol, from about 0.5 to about 5.0 weight percent cyclopentane and from about 0.01 to about 0.2 weight percent nitromethane.

In another preferred embodiment of the invention the azeotrope-like compositions comprise from about 93.5 to about 98.1 weight percent dichlorotrifluoroethane, from about 1.2 to about 1.8 weight percent methanol, from about 0.7 to about 4.7 weight percent cyclopentane and from about 0.01 to about 0.1 weight percent nitromethane.

In another preferred embodiment of the invention, the azeotrope-like compositions comprise about 98.1 weight percent 2,2-dichloro-1,1,2-trifluoroethane, about 1.2 weight percent methanol, about 0.7 weight percent cyclopentane and about 0.01 weight percent nitromethane.

In yet another preferred embodiment of the invention, the azeotrope-like compositions comprise from about 93.5 to about 95.2 weight percent 1,2-dichloro-1,1,2-trifluoroethane, from about 1.7 to about 1.8 weight percent methanol, from about 3.1 to about 4.7 weight percent cyclopentane and about 0.01 weight percent nitromethane.

All compositions within the above-identified ranges, as well as certain compositions outside the indicated ranges, are azeotrope-like, as defined more particularly below.

Such compositions based on FC-123 possess constant or essentially constant boiling points of about 27° C. at 760 mm of Hg. Such compositions based on FC-123a possess constant or essentially constant boiling points of about 30.6° C. and 760 mm of Hg. The precise azeotrope compositions have not been determined but have been ascertained to be within the above ranges. Regardless of where the true azeotropes lie, all compositions within the indicated ranges, as well as certain compositions outside the indicated ranges, are azeotrope-like, as defined more particularly below.

These azeotrope-like compositions are stable, safe to use and that the preferred compositions of the inventionn are nonflammable (exhibit no flash point when tested by the Tag Open Cup test method-ASTM D 1310-86) and exhibit excellent solvency power. These compositions are particularly effective when employed in conventional degreasing units for the dissolution of lubricating and cutting oils and the cleaning of such oils from solid surfaces.

From fundamental principles, the thermodynamic state of a system (pure fluid or mixture) is defined by four variables: pressure, temperature, liquid compositions and vapor compositions, or P-T-X-Y, respectively. An azeotrope is a unique characteristic of a system of two or more components where X and Y are equal at the stated P and T. In practice, this means that the components of a mixture cannot be separated during distillation or in vapor phase solvent cleaning when that distillation is carried out at a fixed T (the boiling point of the mixture) and a fixed P (atmospheric pressure).

For the purpose of this discussion, by azeotrope-like composition is intended to mean that the composition behaves like a true azeotrope in terms of its constant boiling characteristics or tendency not to fractionate upon boiling or evaporation. Such composition may or may not be a true azeotrope. Thus, in such compositions, the composition of the vapor formed during boiling or evaporation is identical or substantially identical to the original liquid composition. Hence, during boiling or evaporation, the liquid composition, if it changes at all, changes only to a minimal or negligible extent. This is to be contrasted with non-azeotrope-like compositions in which during boiling or evaporation, the liquid composition changes to a substantial degree.

Thus, in order to determine whether a candidate mixture is "azeotrope-like" within the meaning of this invention, one only has to distill a sample thereof under conditions (i.e resolution—number of plates) which would be expected to separate the mixture into its separate components. If the mixture is non-azeotropic or non-azeotrope-like, the mixture will fractionate, i.e. separate into its various components with the lowest boiling component distilling off first, and so on. If the mixture is azeotrope-like, some finite amount of a first distillation cut will be obtained which contains all of the mixture components and which is constant boiling or behaves as a single substance. This phenomenon cannot occur if the mixture is not azeotrope-like i.e., it is not part of an azeotropic system. If the degree of fractionation of the candidate mixture is unduly great, then a composition closer to the true azeotrope must be selected to minimize fractionation. Of course, upon distillation of an azeotrope-like composition such as in a vapor degreaser, the true azeotrope will form and tend to concentrate.

It follows from the above that another characteristic of azeotrope-like compositions is that there is a range of compositions containing the same components in varying proportions which are azeotrope-like. All such compositions are intended to be covered by the term azeotrope-like as used herein. As an example, it is well known that at differing pressures, the composition of a given azeotrope will vary at least slightly and changes in distillation pressures also change, at least slightly, the distillation temperatures. Thus, an azeotrope of A and B represents a unique type of relationship but with a variable composition depending on temperature and/or pressure. Accordingly, another way of defining azeotrope-like within the meaning of this invention is to state that such mixtures boil within ±1° C. (at about 760 mm Hg±25 mm.) of the boiling point of the preferred compositions disclosed herein (i.e. closest to the true azeotrope). The preferred azeotrope-like compositions boil within ±0.6° C. at about 760 mm Hg±25 mm Hg. In the case of FC-123, the boiling point of the preferred compositions is 27.2° C. In the case of FC-123a, the boiling point of the preferred compositions is 28.9° C.

In the process embodiment of the invention, the azeotrope-like compositions of the invention may be used to clean solid surfaces by treating said surfaces with said compositions in any manner well known to the art such as by dipping or spraying or use of conventional degreasing apparatus.

The FC-123, FC-123a, methanol, cyclopentane and nitromethane components of the novel solvent azeotrope-like compositions of the invention are all commercially available. Preferably they should be used in sufficiently high purity so as to avoid the introduction of adverse influences upon the solvency properties of constant boiling properties of the system.

EXAMPLE 1

The FC-123 azeotrope-like compositions of the invention were determined through the use of distillation techniques designed to provide higher rectification of the distillate than found in most vapor degreaser systems. For this purpose a five theoretical plate Oldershaw distillation column was used with a cold water condensed, manual liquid dividing head. Typically, approximately 350 cc of liquid were charged to the distillation pot. The liquid was a mixture comprised of various combinations of FC-123, methanol, cyclopentane and nitromethane.

The mixture was heated at total reflux for about one hour to ensure equilibration. For most of the runs, the distillate was obtained using a 5:1 reflux ratio at a boil-up rate of 400-500 grams per hr. Approximately 300 cc of product were distilled and 6 approximately equivalent sized overhead cuts were collected. The vapor temperature (of the distillate), pot temperature, and barometric pressure were monitored. A constant boiling fraction was collected and analyzed by gas chromatography to determine the weight percentages of its components. To normalize observed boiling points during different days to 760 mm of mercury pressure, the approximate normal boiling points of FC-123 mixtures were estimated by applying a barometric correction factor of about 29.8 mm Hg/°C., to the observed values. However, it is to be noted that this corrected boiling point is generally accurate up to ±0.4° C. and serves only as a rough comparison of boiling points determined on different days.

By the above described method, it was discovered that a constant boiling mixture at 27.2°±0.5° C. at a pressure of 760 mm Hg was formed for compositions comprising about 98.1 weight percent FC-123, about 1.2 weight percent methanol (MeOH), about 0.7 weight percent cyclopentane and about 0.01 weight percent nitromethane. Supporting distillation data for the mixtures studied are shown in Table I.

TABLE I

| FC-123 | MeOH | Cyclopentane | Nitromethane |
|---|---|---|---|
| STARTING MATERIAL (WT %) | | | |
| 96.8 | 2.35 | 0.74 | 0.11 |
| Constant Boiling Fractions (WT %) | | | |
| 98.1 | 1.17 | 0.67 | 0.01 |

| Vapor Temp. (°C.) | Barometric pressure (mm of Hg) | Approx. B.P. (°C.) Corrected to 760 mm Hg |
|---|---|---|
| 27.1 | 752.2 | 27.2 |

From the above examples, it is readily apparent that additional constant boiling or essentially constant boiling mixtures of the same components can readily be identified by anyone of ordinary skill in this art by the method described. No attempt was made to fully characterize and define the true azeotrope in the system comprising FC-123, methanol, cyclopentane and nitromethane, nor the outer limits of its compositional ranges which are constant boiling. Anyone skilled in the art can readily ascertain other constant boiling or essentially constant boiling mixtures.

EXAMPLES 2-3

The procedurre of Example 1 was repeated except that FC-123a was substituted for FC-123, an automatic liquid dividing head was employed and the reflux ratio used was 5:1. The results demonstrated that a constant boiling mixture at 28.9°±0.4° C. at a pressure of 760 mm Hg was formed for compositions comprising about 93.5 to about 95.2 weight percent FC-123a, from about 1.7 to about 1.8 weight percent methanol (MeOH), from about 3.1 to about 4.7 weight percent cyclopentane and from about 0.1 to about 0.01 weight percent nitromethane. Supporting distillation data are shown in TABLE II.

TABLE II

| Example (Distillation) | FC-123 | MeOH | Cyclopentane | Nitromethane |
|---|---|---|---|---|
| STARTING MATERIAL (WT %) | | | | |
| 2 | 94.1 | 2.78 | 3.02 | 0.11 |
| 3 | 92.8 | 2.07 | 5.0 | 0.12 |
| Constant Boiling Fractions (WT %) | | | | |
| 2 | 95.17 | 1.73 | 3.09 | 0.01 |
| 3 | 93.5 | 1.8 | 4.6 | 0.1 |

| Example (Distillation) | Vapor Temp. (°C.) | Barometric Pressure (mm of Hg) | Approx. B.P. (°C.) Corrected to 760 mm Hg |
|---|---|---|---|
| 2 | 28.7 | 752.2 | 28.8 |
| 3 | 28.8 | 735.5 | 29.0 |
| | | Average | 28.9 ± 0.1 |

EXAMPLE 4

This example illustrates the use of the preferred azeotrope-like compositions of the invention to clean (deflux) printed wiring boards and printed wiring assemblies. A commercial rosin-based flux viz. Kenco 885 (manufactured by Kenco Industries, Inc.) was used in this test.

In the experiment FR-4 epoxy coupons cut to a size of 1"×2¼" were used for fluxing and subsequent cleaning. Prior to fluxing all specimens were pre-cleaned following a vigorous pre-cleaning schedule to ensure very low levels of contamination before fluxing. The ionic contamination was measured by a conductivity bridge which was pre-calibrated using known solutions of NaCl. The conductivity of the wash solution is expressed in equivalent micrograms ($\mu g$) of sodium chloride per square inch of the boards. Utilizing this technique it was determined that all specimens used for the experiments would be pre-cleaned to 0.05 $\mu g$ or less of sodium chloride equivalents.

A measured amount of Kenco 885 flux was applied to each of the coupons. Then these coupons are air dried and dried in the oven at 90° C. for 5 minutes and baked at 230° C. for 1 minute. This procedure simulates the Hollis TDL wave solder machine where these boards were fluxed, preheated and soldered at or near the temperatures used here. The amount of ionic materials left in the board after the drying process in this experiment is of the same order of magnitude as in the wave solder machines. The advantage of this method is a better control of the ionic material put on the board compared to a wave-soldering machine, thereby reducing the error of the experiment.

These fluxed, based coupons were then cleaned in boiling solvents for two minutes, after which the amount of ionics left on the boards was washed off by a 75/25 by weight water-isopropanol (IPA) mixture for 24 hours. This ensures that all the ionics left on the board after cleaning are washed off into the water/IPA mixture. The conductivity of the water/IPA mixture was determined by a conductivity bridge. The method used to determine the conductivity was mentioned previously and conductivity is expressed in equivalent $\mu g$/square inch of NaCl.

Two solvents were used in this test for cleaning; the FC-123 based solvent of the invention, which we shall refer to as Solvent I, and a commercial defluxing solvent named GENESOLV ® DFX which is an azeotrope-like mixture of 1,1,2-trichloro-1,2,2-trifluoroethane, methanol, acetone, isohexane and nitromethane.

(GENESOLV is a registered trademark of Allied-Signal Inc.)

The results from this cleaning experiment are shown in TABLE II. The experiment showed that both the solvents are about equivalent in cleaning. Both of them removed about 87% of the ionics left on the board after the fluxing operation. This result was quite unexpected because it is known that methanol is the most potent solvent to remove ionic contamination and Solvent I contains less methanol than GENESOLV® DFX.

TABLE III

CLEANING STUDY OF FR-4 EPOXY COUPONS IN FC-123 BASED SOLVENTS
(Residue of Uncleaned Boards - 38.3 ± 0.8 μg/in² NaCl Equivalent)

| Solvent | (g/in² NaCl Equivalent) | % Removal |
|---|---|---|
| 1. DFX | 4.9 ± 1.6 | 87 |
| 2. Solvent I | 5.2 ± 0.9 | 86 |

Solvent I contained about 2% methanol as opposed to about 6% methanol in GENESOLV® DFX. The organic solvent FC-123 with only about 2% methanol exhibits an unusually high effect in cleaning the boards from water soluble ionic contamination.

What is claimed is:

1. Azeotrope-like compositions consisting essentially of dichlorotrifluoroethane selected from the group consisting of 2,2-dichloro-1,1,1-trifluoroethane and 1,2-dichloro-1,1,2-trifluoroethane, methanol, cyclopentane and nitromethane wherein the composition with 2,2-dichloro-1,1,1-trifluoroethane has a boiling point of about 27.2° C.±1° C. at about 760 mm Hg±25 mm Hg and the composition with 1,2-dichloro-1,1,2-trifluoroethane has a boiling point of about 28.9° C.±1° C. at about 760 mm Hg±25 mm Hg.

2. Azeotrope-like compositions according to claim 1 in which the dichlorotrifluoroethane component is 2,2-dichloro-1,1,1-trifluoroethane.

3. Azeotrope-like compositions according to claim 1 in which the dichlorotrifluoroethane component is 1,2-dichloro-1,1,2-trifluoroethane.

4. Azeotrope-like compositions consisting essentially of from about 92.8 to about 98.1 weight percent dichlorotrifluoroethane selected from the group consisting of 2,2-dichloro-1,1,1-trifluoroethane and 1,2-dichloro-1,1,2-trifluoroethane, from about 1.2 to about 2.8 weight percent methanol, from about 0.5 to about 5.0 weight percent cyclopentane and from about 0.01 to about 0.2 weight percent nitromethane.

5. Azeotrope-like compositions according to claim 4 consisting essentially of from about 93.5 to about 98.1 weight percent dichlorotrifluoroethane selected from the group consisting of 2,2-dichloro-1,1,1-trifluoroethane and 1,2-dichloro-1,1,2-trifluoroethane, from about 1.2 to about 1.8 weight percent methanol, from about 0.7 to about 4.7 weight percent cyclopentane and from about 0.01 to about 0.1 weight percent nitromethane.

6. Azeotrope-like compositions according to claim 5 consisting essentially of about 98.1 weight percent 2,2-dichloro-1,1,2-trifluoroethane, about 1.2 weight percent methanol, about 0.7 weight percent cyclopentane and about 0.01 weight percent nitromethane.

7. Azeotrope-like compositions according to claim 5 comprising from about 93.5 to about 95.2 weight percent 1,2-dichloro-1,1,2-trifluoroethane, from about 1.7 to about 1.8 weight percent methanol, from about 3.1 to about 4.7 weight percent cyclopentane and from about 0.1 weight percent nitromethane.

8. Azeotrope-like compositions according to claim 2 which boil at about 27.2° C.±0.6° C. at about 760 mg Hg±25 mm Hg.

9. Azeotrope-like compositions according to claim 3 which boil at about 28.9° C.±0.6° C. at about 760 mg Hg±25 mm Hg.

10. The method of cleaning a solid surface which comprises treating said surface with an azeotrope-like composition as defined in claim 1.

11. The method of cleaning a solid surface which comprises treating said surface with an azeotrope-like composition as defined in claim 2.

12. The method of cleaning a solid surface which comprises treating said surface with an azeotrope-like composition as defined in claim 3.

13. The method of cleaning a solid surface which comprises treating said surface with an azeotrope-like composition as defined in claim 4.

* * * * *